United States Patent [19]

Bloecher

[11] Patent Number: 5,039,311
[45] Date of Patent: Aug. 13, 1991

[54] ABRASIVE GRANULES

[75] Inventor: Ulrich Bloecher, St. Paul, Minn.

[73] Assignee: Minnesota Mining and Manufacturing Company, St. Paul, Minn.

[21] Appl. No.: 488,287

[22] Filed: Mar. 2, 1990

[51] Int. Cl.⁵ .............................................. B24B 1/00
[52] U.S. Cl. ...................................... 51/295; 51/298; 51/307; 51/308; 51/309
[58] Field of Search ................. 51/295, 298, 307, 308, 51/309

[56] References Cited

U.S. PATENT DOCUMENTS

| | | | |
|---|---|---|---|
| 2,194,472 | 3/1940 | Jackson | 51/185 |
| 4,311,489 | 1/1982 | Kressner | 51/298 |
| 4,541,842 | 9/1985 | Rostoker | 51/298 |
| 4,652,275 | 3/1987 | Bloecher et al. | 51/298 |
| 4,799,939 | 1/1989 | Bloecher et al. | 51/295 |

*Primary Examiner*—William R. Dixon, Jr.
*Assistant Examiner*—Willie J. Thompson
*Attorney, Agent, or Firm*—Gary L. Griswold; Walter N. Kirn; David L. Weinstein

[57] ABSTRACT

An erodable abrasive granule comprising a plurality of first abrasive grains bonded together by a first binder to form an erodable base agglomerate and at least a partial coating of second abrasive grains bonded to the periphery of the base agglomerate by means of a second binder. These abrasive granules can be incorporated into a wide variety of abrasive articles such as grinding wheels, coated abrasives, and non-woven abrasives.

17 Claims, 2 Drawing Sheets

ABRASIVE GRANULES

BACKGROUND OF THE INVENTION

1. Field of the Invention

This invention relates to an abrasive granule, and, in particular, one which comprises an agglomerate having individual abrasive grains coated on the periphery thereof.

2. Discussion of the Art

Conventional coated abrasives typically consist of a single layer of abrasive grain adhered to a backing. It has been found that only up to about 15% of the grains in the layer are actually utilized in removing any of the workpiece. It follows then that about 85% of the grains in the layer are wasted. Furthermore, the backing, one of the more expensive components of the coated abrasive, must also be disposed of before the end of its useful life.

To overcome this problem of waste, many attempts have been made to distribute the abrasive grains on the backing in such a manner so that a higher percentage of abrasive grains can be utilized, thus leading to extended life of the abrasive product. The extended life further leads to fewer belt or disc changes by the operators, thereby saving time and reducing labor costs. It is apparent that merely depositing a thick layer of abrasive grains on the backing will not solve the problem, because the grains lying below the topmost grains are not likely to be used.

The prior art describes several attempts to distribute abrasive grains in a coated abrasive in such a way as to prolong the life of the product. U.S. Pat. No. Re. 29,808 (Wagner) describes a grinding material comprising a multiplicity of hollow bodies whose walls contain abrasive grains and a bonding means for bonding the abrasive grains to each other at the wall surface, whereby during grinding a multiplicity of fresh abrasive grains become continuously available at the grinding surface wherein the grinding action of the grinding surface depends exclusively on the size of the abrasive grains.

U.S. Pat. Nos. 4,311,489 (Kressner); 4,652,275 (Bloecher et al.) and 4,799,939 (Bloecher et al.) teach erodable agglomerates which consist of a plurality of abrasive grains bound together by an inorganic or resinous binder. The agglomerates gradually wear down during grinding by successive removal of dulled abrasive grains from the agglomerates.

U.S. Pat. No. 4,364,746 (Bitzer et al.) describes an abrasive article consisting a plurality of different types of erodable agglomerates. Each agglomerate type exhibits substantially different structural strength qualities, and therefore different abilities to sustain abrading forces. The use of these different agglomerate types results in a uniform cutting depth, a uniform rate of wear and a longer life.

U.S. Pat. No. 2,542,058 (Riedesel) discloses a coated abrasive having a first layer of resilient particles bonded to a backing and a second layer of abrasive grains coated over the resilient particles. The resilient particles can be cork, vulcanized rubber or other natural and synthetic compressible and resilient materials.

Although the products outlined in the above mentioned patents are useful, even greater utilization of abrasive grains in abrasive articles is desired by industry.

SUMMARY OF THE INVENTION

This invention provides an erodable abrasive granule comprising a plurality of first abrasive grains bonded together by a first binder to form an erodable base agglomerate at least partially coated with second abrasive grains bonded to the periphery of the base agglomerate by means of a second binder. These abrasive granules can be incorporated into a wide variety of abrasive articles such as grinding wheels, coated abrasives and non-woven abrasives.

The addition of these second abrasive grains dramatically increases the grinding performance over the base agglomerate by itself. The abrasive granule is strong enough to withstand abrading forces such that the granule exhibits a long and useful life. However, the granule is also sufficiently erodable such that the worn or dull first and second abrasive grains are sloughed off, and unused abrasive grains are presented to the grinding interface. The combination of the two factors results in an abrasive granule with excellent abrading qualities not previously known in the art.

DETAILED DESCRIPTION

Figure 1:
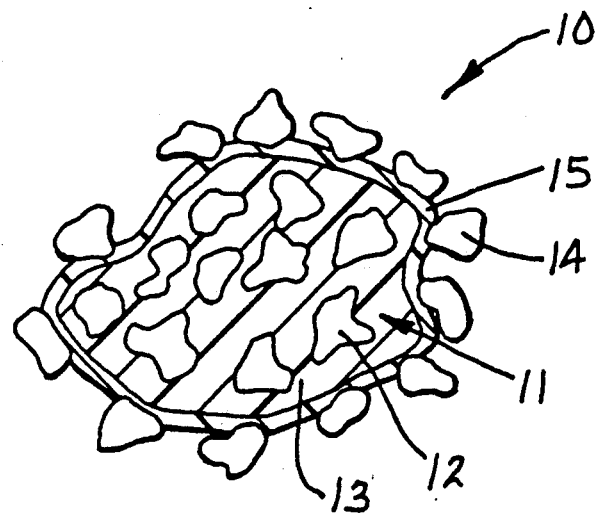
FIG. 1 is a schematic representation in cross-section of an abrasive granule of this invention having a relatively open coat of the second abrasive grain.

Referring to FIG. 1, the abrasive granule of this invention is designated by reference numeral 10. An agglomerate 11, hereinafter called the base agglomerate 11, comprises a plurality of first abrasive grains 12 bonded together by a first binder 13. A coating of second abrasive grains 14 is bonded to base agglomerate 11 on the periphery thereof by means of a second binder 15. Base agglomerate 11 can be partially coated or completely coated with second abrasive grains 14. Base agglomerates are well known in the art and examples of such are described in U.S. Pat. Nos. 2,194,472; 2,806,772; 3,916,584; 3,982,359; 4,311,849; 4,364,746; 4,393,021; 4,541,842; 4,652,275; and 4,799,939, all of which are incorporated herein by reference.

First abrasive grains 12 and second abrasive grains 14 may be made of the same or different abrasive materials. Typical examples of abrasive materials suitable for grains 12 and 14 include fused aluminum oxide, heat-treated aluminum oxide, silicon carbide, alumina zirconia, ceramic aluminum oxide, diamond, boron carbide, flint, garnet, cubic boron nitride, silicon nitride, and combinations thereof. It is preferred that first abrasive grains 12 be made of fused aluminum oxide and second abrasive grains 14 be made of ceramic aluminum oxide or alumina zirconia. Typical examples of ceramic aluminum oxide include those described in U.S. Pat. Nos. 4,314,827; 4,744,802; and 4,770,671.

First and second binders 13 and 15 can be the same materials or they can be different materials. First binder 13 can be any organic or inorganic binder material that exhibits sufficient adhesion to prevent premature fracture of base agglomerate 11. Second binder 15 can be any organic or inorganic binder material that exhibits sufficient adhesion to prevent premature sloughing off of second abrasive grains 14. Examples of such binders include: resinous adhesives such as phenolic resins, urethane resins, urea-formaldehyde resins, melamine-formaldehyde resins, epoxy resins, alkyd resins, and acrylate resins; inorganic binders such as clay, silica, and silicates; and metallic binders such as copper, tin, nickel, cobalt, iron, silver, and alloys thereof. The preferred materials for the binder are resinous binders, particularly phenolic resins.

The binders can also contain other additives well known in the art such as: fillers, grinding aids, plasticizers, wetting agents, and coupling agents. Typical examples of fillers include carbonates, e.g., calcium carbonate, silica, and silicates. Representative examples of grinding aids include inorganic halides, e.g., cryolite, potassium borofluoride, inorganic sulfides, and chlorinated hydrocarbons.

Base agglomerate 11 also may include other additives such as wood pulp, mica, perlite, ceramic bubbles, coke, glass beads, grinding aids, graphite, glass bubbles, and plastic bubbles. These additives affect the hardness, toughness, and friability of base agglomerate 11. For example, the addition of glass bubbles increases the friability of base agglomerate 11.

The choice of abrasive grains, binders, binder additives, base agglomerate additives, and weight percentages of the foregoing significantly affects the performance of resulting abrasive granule 10. The abrasive granule and the base agglomerate must be strong enough to withstand abrading forces such that they do not disintegrate during use, thereby resulting in an abrasive product having a very long useful life. However, the abrasive granule and the base agglomerate must be sufficiently erodable such that when both first and second abrasive grains are worn or dulled, they can be sloughed off to expose unused abrasive grains. For example, abrasive granules having very hard binders erode more slowly than abrasive granules having very soft binders. Also, an abrasive granule having a relatively high percentage of binder erodes more slowly than an abrasive granule having a relatively low percentage of binder. Thus, the optimum composition for a given abrasive granule depends upon the abrading application in which the granule will be used.

A typical formulation for a base agglomerate can range from 70 to 95 percent by weight of first abrasive grains 12, from about 5 to 30 percent by weight binder, and from 0 to 15 percent by weight other additives.

The size of base agglomerate 11 preferably ranges from 150 to 3000 micrometers in the largest dimension. If first abrasive grains 12 are very fine, for example corresponding to an American National Standards Institute (ANSI) standard B74.18, 1984, grade 180, then approximately between 10 and 100 individual grains 12 will be contained in each base agglomerate. If first abrasive grains 12 correspond to an ANSI grade 36, then between 2 and 80 grains will be contained in each base agglomerate. The grade and type of first abrasive grains 12 is not critical, and the grade typically ranges from 24 to 1000. Base agglomerate 11 is typically irregular in shape, but it can also be formed into spheres, spheroids, ellipsoids, pellets, rods, or other conventional forms.

Figure 2:
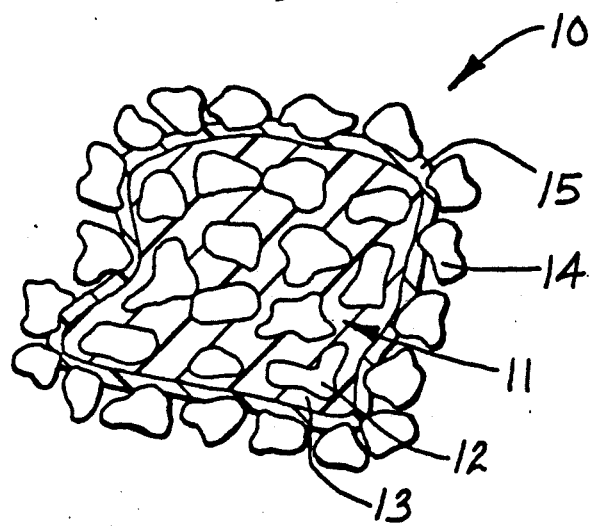
FIG. 2 is a schematic representation in cross-section of an abrasive granule of this invention having a relatively closed coat of the second abrasive grain.
Figure 3:
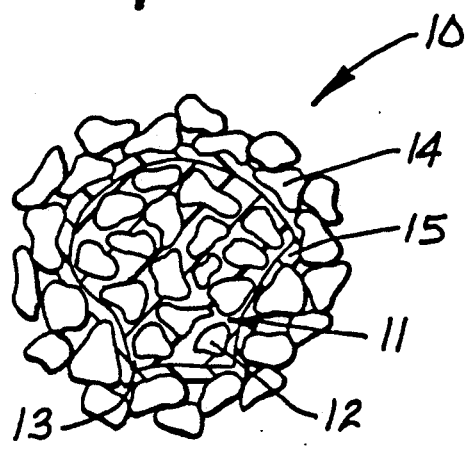
FIG. 3 is a schematic representation in cross-section of an abrasive granule of this invention having multiple coatings of the second abrasive grain.

Referring to FIG. 1, the coating of second abrasive grains 14 is depicted as an open coat, i.e., there are relatively large spaces between second abrasive grains 14. FIG. 2 depicts a closed coat of second abrasive grains 14, i.e., the spaces between second abrasive grains 14 are relatively small. This invention encompasses both open and closed coats of second abrasive grains 14. Base agglomerate 11 can also bear more than one coat of second abrasive grains 14, i.e., multiple coats. FIG. 3 depicts an abrasive granule 10 having multiple coats of second abrasive grains 14. Second abrasive grains 14 may have an orientation of anywhere from zero (laying flat) to 90 degrees (perpendicular) relative to base agglomerate 11.

Figure 4:
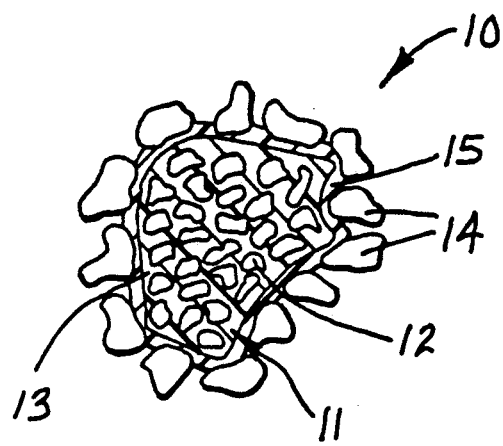
FIG. 4 is a schematic representation in cross-section of an abrasive granule of this invention in which the average particle size of the second abrasive is larger than that the average particle size of the first abrasive grain.

It is preferred that the average size of second abrasive grains 14 be greater than the average size of first abrasive grains 12 for both open and closed coat embodiments. This preference is illustrated in FIG. 4 for the open coat embodiment. This selection results in improved abrading characteristics as compared with an abrasive granule containing first and second abrasive grains of the same average size. In general, the average size of second abrasive grains 14 is preferably one or more ANSI grades larger than the average size of first abrasive grains 12.

Individual abrasive grains can be used along with the abrasive granules of this invention, and the proportion of individual abrasive grains employed in this manner may be as high as 70% of the weight of the abrasive granules.

The abrasive granules of this invention can be employed in bonded abrasive products e.g., grinding wheels, non-woven abrasive products, coated abrasive products, and other products where abrasive grains are typically employed.

Bonded abrasive products typically comprise a shaped mass of abrasive granules held together by organic or vitrified binder materials. The shaped mass is typically in the form of a grinding wheel. Non-woven abrasive products typically comprise an open, porous, lofty, polymeric, filamentous structure having abrasive granules distributed throughout the structure and adherently bonded therein by an adhesive material. Methods for making such non-woven abrasive products are well known.

Figure 5:
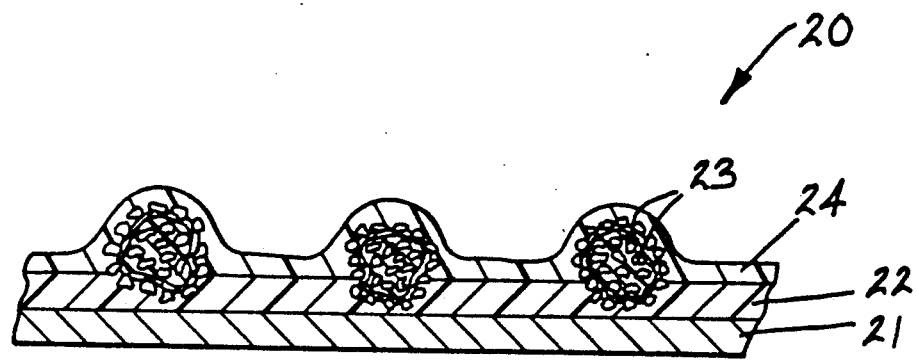
FIG. 5 is a schematic representation in cross-section of a coated abrasive article employing the abrasive granules of the present invention.

The abrasive granules of this invention can be applied to a backing to form a coated abrasive product. The backing can be any material that is compatible with the components of the abrasive granules and maintains its integrity under curing and abrading conditions. It is preferred that the backing be in the form of a conformable, flexible sheet. Backing materials suitable for coated abrasives of the present invention are well-known in the art and include vulcanized fiber, polymers, papers, woven fabrics, stitchbonded fabrics, nonwoven fabrics, and foils. Coated abrasive products can be prepared in a conventional manner, for example, applying a make coat over the backing, drop coating abrasive granules over the make coat, applying a size coat, and then curing the thus-applied coatings. The make coat and size coat can be made from conventional materials, e.g., phenolic resins, urea-formaldehyde resins, melamine-formaldehyde resins, acrylate resins, epoxy resins, hide glue, and varnish. The size coat should not adversely affect erodability of the abrasive granules, i.e., the size coat should not flood the surface of the coated abrasive. In some cases, a size coat may not be required. Referring to FIG. 5, coated abrasive product 20 comprises a backing 21. Overlying backing 21 is a make coat 22, in which are embedded abrasive granules 23 of this invention. A size coat 24 has been applied over make coat 22 and abrasive granules 23.

There are several different methods for preparing the abrasive granules of this invention. Base agglomerate 11 can be made according to techniques known in the art; see, for example, U.S. Pat. Nos. 2,194,472; 2,806,772; 3,916,584; 3,982,359; 4,311,849; 4,364,746; 4,393,021; 4,541,842; 4,652,275; and 4,799,939. The periphery of base agglomerate 11 can then be coated with second binder 15; then second abrasive grains 14 are applied to second binder 15. Binder 15 can be applied by various means, such as, for example, by a blade mixer or by a spray apparatus. In either case, binder 15 is preferably uniformly distributed over the periphery of base agglomerate 11. Second abrasive grains 14 can be applied to second binder 15 by various means, such as, for example, by a rotary tumbler or by a vibratory bed. After second abrasive grains 14 are applied, binder 15 is caused to solidify to form abrasive granule 10. Abrasive granule 10 can then be utilized in a bonded abrasive, a non-woven abrasive, or a coated abrasive. There are two additional methods for manufacturing abrasive granules suitable for coated abrasive products. In one method, the backing is first coated with a binder to form a make coat; then a layer of base agglomerates 11 is projected into the make coat. Next, the periphery of base agglomerate 11 is coated with binder 15, and second abrasive grains 14 are electrostatically projected into binder 15. The make coat and binder 15 are then caused to solidify; next, a binder can be applied over abrasive granules 10 to form a size coat. Finally, the size coat is caused to solidify to form a coated abrasive product. In another method, the periphery of base agglomerate 11 is first coated with binder 15. The backing is then coated with a binder to form a make coat, and a layer of base agglomerates 11 containing binder 15 on the periphery of base agglomerates 11 is projected into the make coat. Then, second abrasive grains 14 are electrostatically projected into binder 15. The make coat and the second binder are then caused to solidify; next, a binder can be applied over abrasive granules 10 to form a size coat. Finally, the size coat is caused to solidify to form a coated abrasive product.

Figure 6:
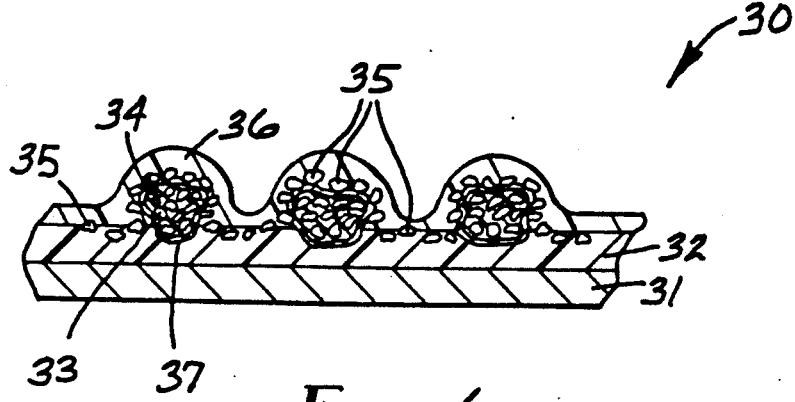
FIG. 6 is a schematic representation in cross-section of a coated abrasive article having bonded to the backing a base agglomerate partially coated with second abrasive grains substantially bonded over the periphery of the base agglomerate. In this embodiment, the second abrasive grains are bonded primarily to the portion of the base agglomerate not in contact with the make coat of the coated abrasive product.

FIG. 6 depicts a coated abrasive 30 in which abrasive granules are fabricated during the manufacture of the coated abrasive product. Referring to FIG. 6, coated abrasive product 30 comprises a backing 31. Overlying backing 31 is a make coat 32, in which are embedded abrasive granules 33 of this invention. Base agglomerates 34 are bonded to backing 31 by a binder which forms make coat 32. Over base agglomerates 34 is bonded a plurality of second abrasive grains 35. In addition, second abrasive grains 35 are projected into make coat 32. However, these second abrasive grains 35 located in make coat 32 have minimal effects on grinding, because they are much smaller than abrasive granules 33. Over the composites comprising base agglomerate 34 and second abrasive grains 35 is size coat 36. Size coat 36 provides further reinforcement for base agglomerate 34 and second abrasive grains 35. Second abrasive grains 35 are initially bonded to base agglomerate 34 by second binder layer 37, and make coat 32 and size coat 36 further reinforce the bonding between second abrasive grains 35 and base agglomerate 34. In this embodiment, second abrasive grains 35 extend primarily from the portion of base agglomerate 34 that is not in contact with make coat 32.

The following non-limiting examples will further illustrate the invention. All formulation ratios and percentages are based upon weight.

EXAMPLE 1

The base agglomerates for this example were made according to the procedure described in U.S. Pat. No. 4,652,275, and contained 81% by weight grade P180 heat-treated fused aluminum oxide, 8.5% by weight cryolite, 8.5% by weight phenolic resin, and 1% by weight wood pulp. The base agglomerates were screened to a $-24 +38$ fraction using United States standard screens. The base agglomerates (1100 g) were mixed with a second binder comprising 100 g of cryolite, 76 g of phenolic resin, 15 g of water, and 9 g of ethylene glycol monoethyl ether for approximately 10 minutes in a 5 quart blade mixer. Next, the resulting mixture was placed on a first vibratory feeder; on a second vibratory feeder was placed grade 120 ceramic aluminum oxide grains, commercially available from Minnesota Mining and Manufacturing Company, St. Paul, Minn., under the trade designation "Cubitron" abrasive grain. The mixture and the ceramic aluminum oxide grains were tumbled for 2 minutes in such a manner that the ceramic aluminum oxide was bonded to the base agglomerate. The feed rate of the ceramic aluminum oxide was in excess of the feed rate of base agglomerates, so that the maximum amount of ceramic aluminum oxide grains was coated on the periphery of the base agglomerate. After the tumbling operation, the resulting abrasive granules were placed in an oven for 12 hours at 93° C. to cure the second binder. Next, the abrasive granules were screened to a $-14$ to $+120$ fraction in order to remove any large clumps of abrasive granules that might have formed during curing.

The thus-formed abrasive granules were used to prepare coated abrasive fiber discs, which were then tested for abrading properties. The discs were prepared in a conventional manner. The backings were 0.76 mm vulcanized fiber; the make resin was calcium carbonate filled phenolic resin; and the size resin was cryolite filled phenolic resin. The make resin was pre-cured for 90 minutes at 88° C., and the size resin was pre-cured for 90 minutes at 88° C. followed by a final cure for 10 hours at 100° C. The coating weights were 201 g/m² for the make resin, 460 g/m² for the abrasive granules, and 189 g/m² for the size resin. Coating was conducted by conventional techniques in a one-trip operation with curing being conducted in a forced air oven. The cured discs were first flexed to controllably break the hard bonding resins, then mounted on a beveled aluminum back-up pad, and finally used to grind the face of a 1.3 cm by 18 cm 1018 steel workpiece. The disc was driven at 6,000 rpm while the portion of the disc overlaying the beveled edge of the back-up pad contacted the workpiece at a pressure of 5.9 kg. Each disc was used to grind a separate workpiece for a one minute interval and the amount of metal removed, or cut, during this interval was calculated. The test was ended when the cut over this one minute interval was less than one half the cut for the first minute for the control product. The test results can be found in Table I.

EXAMPLE 2

The abrasive granules and coated abrasive articles of this example were made and tested in the same manner as was used in Example 1, except that the grade P180 fused aluminum oxide abrasive grains in the base agglomerates were replaced with grade P180 ceramic aluminum oxide abrasive grains. In addition, the coating weight of the abrasive granules was 475 g/m$^2$ and the coating weight of the size coat was 240 g/m$^2$. The ceramic aluminum oxide abrasive grains were commercially available from the Minnesota Mining and Manufacturing Company, St. Paul, Minn., under the trade designation "Cubitron" abrasive grain. The coated abrasive article was tested in the same manner as was the coated abrasive article of Example 1. The test results can be found in Table I.

EXAMPLE 3

The abrasive granules and coated abrasive articles of this example were made and tested in the same manner as was used in Example 1, except that the ceramic aluminum oxide grains were replaced with grade P120 heat-treated fused aluminum oxide grains. In addition, the coating weight of the abrasive granules was 446 g/m$^2$ and the coating weight of the size coat was 180 g/m$^2$. The coated abrasive article was tested in the same manner as was the coated abrasive article of Example 1. The test results can be found in Table I.

CONTROL A

The coated abrasive article in Control Example A was a grade P120 Multicut A fiber disc, Product Number 289C, commercially available from Minnesota Mining and Manufacturing Company, St. Paul, Minn. This product contained an aluminum oxide base agglomerate; it did not contain any outer coating. The coated abrasive article was tested in the same manner as was the coated abrasive article of Example 1. The test results can be found in Table I.

TABLE I

| Example no. | Initial cut (g) | Final cut (g) | Total cut (g) | % of Control |
|---|---|---|---|---|
| 1 | 24 | 13 | 526 | 263 |
| 2 | 27 | 10 | 556 | 278 |
| 3 | 25 | 11 | 326 | 163 |
| Control A | 29 | 11 | 200 | 100 |

It is clear from the data in Table I that the addition of the coating of second abrasive grains over the base agglomerate significantly improved the performance of the resulting coated abrasive article.

EXAMPLES 4 TO 8

Examples 4 through 8 demonstrate various embodiments of the present invention.

EXAMPLE 4

The abrasive granules were made and incorporated into a coated abrasive article in the same manner as was used in Example 1. The testing was identical except that the test was ended when the coated abrasive containing the abrasive granules cut an amount less than 10 g in a one minute interval. The test results can be found in Table II.

EXAMPLE 5

The base agglomerates for this example were made according to the procedure used in Example 1, except that the mineral in the base agglomerates was grade P120 heat-treated fused aluminum oxide. The base agglomerates were screened to a −24 +38 fraction using United States standard screens. Next, the base agglomerates were mixed with cryolite and a resole phenolic resin in a 10 gallon blade mixer until the phenolic resin coated the periphery of the base agglomerates. The period of mixing was approximately 10 minutes. The resole phenolic resin contained 76% solids and 24% solvent (a 50/50 ratio of water and ethylene glycol monoethyl ether). The concentration of components in the mixture was 84.6% base agglomerate, 7.7% cryolite, 5.9% resole phenolic, and 1.8% solvent. Next, a calcium carbonate filled resole phenolic make resin was applied to 0.76 mm thick vulcanized fiber backing. The base agglomerates containing the cryolite/phenolic resin coating were then drop coated into the make resin. Immediately after the drop coating step, grade P120 heat-treated fused aluminum oxide grains were electrostatically coated onto the cryolite/phenolic resin coating over the base agglomerates. The resulting material was then pre-cured for 90 minutes at 88° C. After the pre-cure, a cryolite filled resole phenolic size coat was applied. This coat was pre-cured for 90 minutes at 88° C. and final cured for 10 hours at 100° C. The coating weights were the same as Example 1. The cured discs were conventionally flexed to controllably break the hard bonding resins. The coated abrasive article was tested in the same manner as was the coated abrasive article of Example 4. The test results can be found in Table II.

EXAMPLE 6

The abrasive granules and coated abrasive article of this example were identical to the abrasive granules and coated abrasive article, respectively, of Example 4, except that the second abrasive grains were grade P120 heat-treated fused aluminum oxide abrasive grains. The coated abrasive article was tested in the same manner as was the coated abrasive article of Example 4. The test results can be found in Table II.

EXAMPLE 7

The abrasive granules and coated abrasive article of this example were identical to the abrasive granules and coated abrasive article, respectively, of Example 5, except that the first abrasive grains in the base agglomerates were replaced with grade P180 heat-treated fused aluminum oxide grains. The coated abrasive article was tested in the same manner as was the coated abrasive article of Example 4. The test results can be found in Table II.

EXAMPLE 8

The abrasive granules and coated abrasive article of this example were identical to the abrasive granules and coated abrasive article, respectively, of Example 7, except that the second abrasive grains were replaced with grade P120 ceramic aluminum oxide grains commercially available from Minnesota Mining and Manufacturing Company, St. Paul, Minn., under the trade designation "Cubitron" abrasive grain. The coated abrasive article was tested in the same manner as was the coated abrasive article of Example 4. The test results can be found in Table II.

CONTROL EXAMPLE B

The coated abrasive article in Control Example B contained a base agglomerate that did not contain any coating on the periphery thereof. The base agglomerate was made according to the procedure described in U.S. Pat. No. 4,652,275, and contained 81% by weight grade P120 ceramic aluminum oxide grains, 8.5% by weight cryolite, 8.5% by weight phenolic resin, and 1% by weight wood pulp. The ceramic aluminum oxide grains were available from Minnesota Mining and Manufacturing Company, St. Paul, Minn., under the trade designation "Cubitron" abrasive grain. The coated abrasive article was prepared according to the procedure of Example 4. The coated abrasive article was tested in the same manner as was the coated abrasive article of Example 4. The test results can be found in Table II.

TABLE II

| Example no | Total cut (g) | % of Control |
| --- | --- | --- |
| 4 | 581 | 159 |
| 5 | 451 | 123 |
| 6 | 498 | 136 |
| 7 | 289 | 79 |
| 8 | 224 | 75 |
| Control A | 365 | 100 |
| Control B | 391 | 107 |

Examples 4-8 and Control Examples A and B demonstrate relative performance between various embodiments of the present invention.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An erodable abrasive granule, comprising:
   a. an erodable base agglomerate comprising a plurality of first abrasive grains in a binder; and
   b. over at least a portion of said base agglomerate, a coating comprising a plurality of second abrasive grains bonded to said base agglomerate,
said abrasive granule and said base agglomerate having sufficient strength to withstand abrading forces such that they do not disintegrate during use.

2. The abrasive granule of claim 1, wherein the size of the second abrasive grains is greater than the size of the first abrasive grains.

3. The abrasive granule of claim 1, wherein the base agglomerate further comprise additives selected from the group consisting of wood pulp, glass beads, glass bubbles, graphite, coke, ceramic bubbles, mica, perlite, and mixtures thereof.

4. The abrasive granule of claim 1, wherein the first abrasive grains or second abrasive grains, or both, are selected from the group consisting of fused aluminum oxide, heat-treated aluminum oxide, silicon carbide, alumina zirconia, ceramic aluminum oxide, diamond, boron carbide, flint, garnet, cubic boron nitride, silicon nitride, and combinations thereof.

5. The abrasive granule of claim 1, wherein the second abrasive grains are selected from the group consisting of ceramic aluminum oxide, alumina zirconia, diamond, and cubic boron nitride.

6. The abrasive granule of claim 1, wherein said binder is selected from the group consisting of resinous adhesives, inorganic adhesives, and metal adhesives.

7. The abrasive granule of claim 6, wherein said resinous adhesive is selected from the group consisting of phenolic resins, urea-formaldehyde resins, melamine-formaldehyde resins, epoxy resins, alkyd resins, and acrylate resins.

8. The abrasive granule of claim 7, wherein said resinous adhesive further comprises an additive selected from the group consisting of fillers, grinding aids, plasticizers, wetting agents, and coupling agents.

9. The abrasive granule of claim 1, wherein said second abrasive grains are bonded to said base agglomerate by a binder selected from the group consisting of resinous adhesives, inorganic adhesives, and metal adhesives.

10. The abrasive granule of claim 9, wherein said resinous adhesive is selected from the group consisting of phenolic resins, urea-formaldehyde resins, melamine-formaldehyde resins, epoxy resins, alkyd resins, and acrylate resins.

11. The abrasive granule of claim 10, wherein said resinous adhesive further comprises an additive selected from the group consisting of fillers, grinding aids, plasticizers, wetting agents, and coupling agents.

12. The abrasive granule of claim 1, wherein there are at least two coatings of second abrasive grain.

13. The abrasive granule of claim 1, wherein said second abrasive grains are oriented relative to the base agglomerate.

14. A coated abrasive article comprising the abrasive granules of claim 1.

15. The coated abrasive article of claim 14, wherein said abrasive granules are secured to a backing by a make coat and a size coat.

16. A bonded abrasive article comprising the abrasive granules of claim 1.

17. A non-woven abrasive article comprising the abrasive granules of claim 1.

* * * * *

UNITED STATES PATENT AND TRADEMARK OFFICE
CERTIFICATE OF CORRECTION

PATENT NO. : 5,039,311
DATED : August 13, 1991
INVENTOR(S) : Bloecher

It is certified that error appears in the above-indentified patent and that said Letters Patent is hereby corrected as shown below:

On the title page: Item [56] Reference Cited add the following U.S. Patent Documents:

| | | | |
|---|---|---|---|
| Re. 29808 | 10/1978 | Wagner | 51/296 |
| 2,194,472 | 3/1940 | Jackson | 51/185 |
| 2,542,058 | 2/1951 | Riedesel | 51/185 |
| 2,806,772 | 9/1957 | Robie | 51/296 |
| 3,916,584 | 11/1975 | Howard et al. | 51/308 |
| 3,982,359 | 9/1976 | Elbel et al. | 51/295 |
| 4,311,489 | 1/1982 | Kressner | 51/298 |
| 4,314,827 | 2/1982 | Leitheiser et al. | 51/298 |
| 4,364,746 | 12/1982 | Bitzer et al. | 51/298 |
| 4,393,021 | 7/1983 | Eisenberg et al. | 264/143 |
| 4,541,842 | 9/1985 | Rostoker | 51/296 |
| 4,652,275 | 3/1987 | Bloecher et al. | 51/298 |
| 4,744,802 | 5/1988 | Schwabel | 51/309 |
| 4,770,671 | 9/1988 | Monroe et al. | 51/293 |
| 4,799,939 | 1/1989 | Bloecher et al. | 51/293 |

Signed and Sealed this

First Day of March, 1994

Attest:

BRUCE LEHMAN

Attesting Officer

Commissioner of Patents and Trademarks